D. S. WAUGH.

DRILL HOLE CLEANING ATTACHMENT FOR HAMMER DRILLS.

APPLICATION FILED DEC. 27, 1909.

Reissued Apr. 9, 1912.

13,403.

2 SHEETS—SHEET 1.

WITNESSES

Chas. K. Davis

E. G. McCarthy

Daniel S. Waugh

INVENTOR, by R. H. Foster

Attorney

COLUMBIA PLANOGRAPH CO., WASHINGTON, D. C.

D. S. WAUGH.
DRILL HOLE CLEANING ATTACHMENT FOR HAMMER DRILLS.
APPLICATION FILED DEC. 27, 1909.
Reissued Apr. 9, 1912.
13,403.
2 SHEETS—SHEET 2.
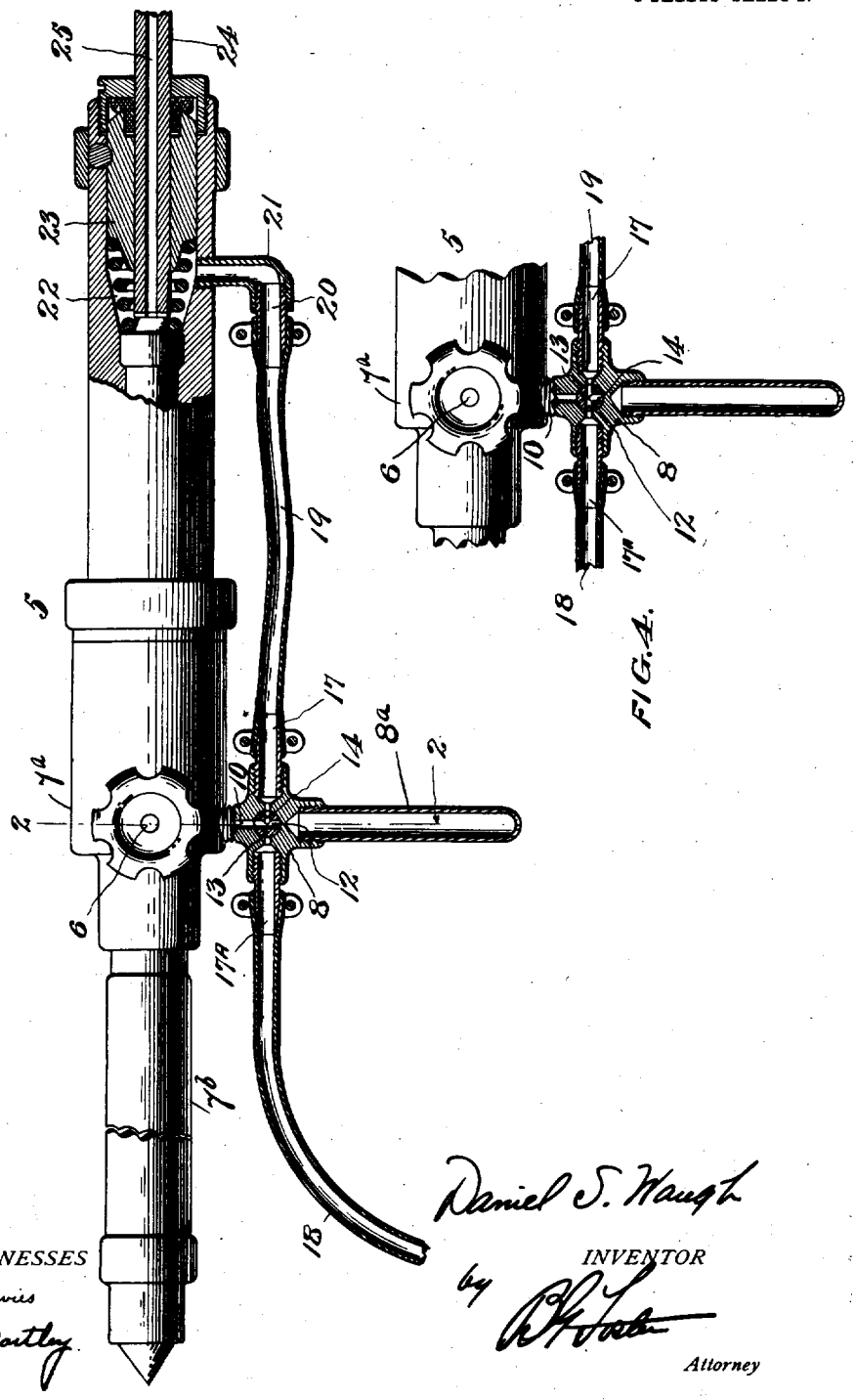
WITNESSES
Chas. K. Davis
E. G. McCartney
Daniel S. Waugh
INVENTOR
by
Attorney
COLUMBIA PLANOGRAPH CO., WASHINGTON, D. C.

UNITED STATES PATENT OFFICE.

DANIEL S. WAUGH, OF DENVER, COLORADO, ASSIGNOR TO THE DENVER ROCK DRILL AND MACHINERY COMPANY, OF DENVER, COLORADO.

DRILL-HOLE-CLEANING ATTACHMENT FOR HAMMER-DRILLS.

13,403. Specification of Reissued Letters Patent. Reissued Apr. 9, 1912.

Original No. 907,430, dated December 22, 1908, Serial No. 375,740. Application for reissue filed December 27, 1909. Serial No. 535,226.

*To all whom it may concern:*

Be it known that I, DANIEL S. WAUGH, a citizen of the United States, residing at Denver, in the county of Denver and State of Colorado, have invented new and useful Improvements in Drill-Hole-Cleaning Attachments for Hammer-Drills, of which the following is a specification.

My invention relates to improvements in means for controlling the passage of air and water through a hollow drill bit to the drill hole.

By virtue of my improvement, the same valve that regulates the supply of water to the drill hole may also be utilized for cutting off the water and turning on the air whereby the one or the other fluid as may be desired may be utilized for this purpose. In putting in down-holes, it is preferred to utilize the water, while in drilling up-holes, it is preferred to utilize the air since in the up-hole work the drill cuttings would be washed out in the form of mud and interfere with the work of those in charge of the drill. On the other hand, it is advisable to use the water as much as possible, since it obviates or overcomes the dust incident to the use of air alone for cleaning the drill hole.

By virtue of my improvement the mechanism may be readily adjusted to cut off the water and turn on the air or vice versa without stopping the machine or when the machine is at a standstill. To this end, I employ a three-way valve adapted to be so adjusted that one of its ports communicates with a passage leading from the motive fluid supply of the main valve, at the same time cutting off the water supply. Again, the valve may be so adjusted as to cut off the air supply and allow the passage of water to the drill hole.

Having briefly outlined my improved construction, I will proceed to describe the same in detail, reference being made to the accompanying drawing, in which is illustrated an embodiment thereof.

Figure 1:
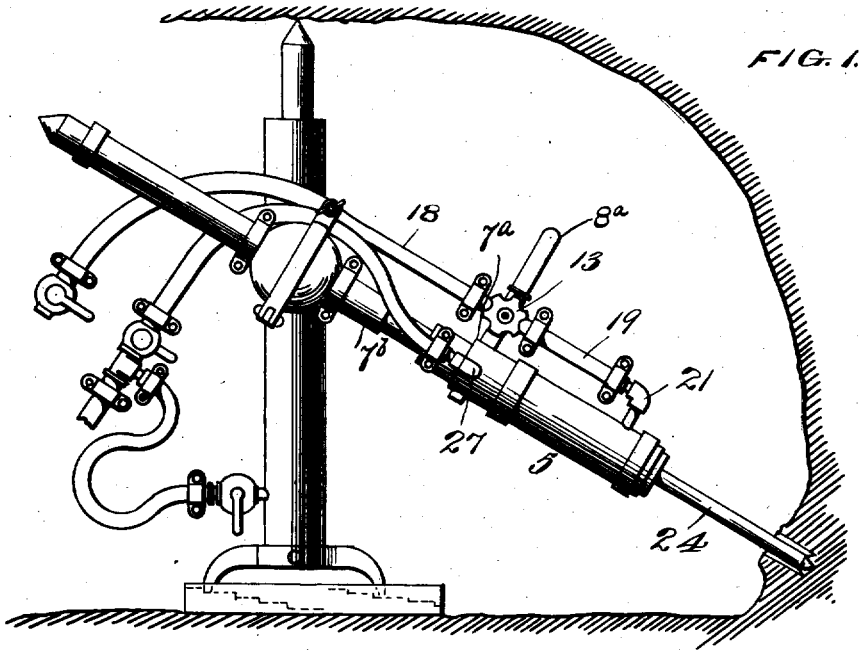
Figure 2:
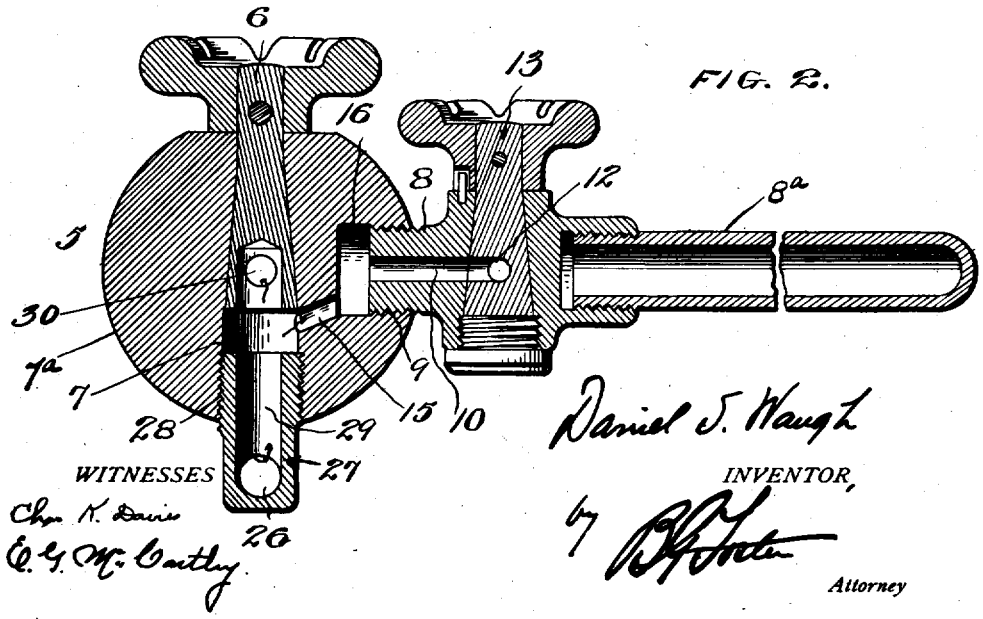

In this drawing, Figure 1 is an elevation, illustrating a hammer drill equipped with my improvements. Fig. 2 is a section taken through the valve mechanism, the parts being shown on a larger scale. This section is taken on the line 2—2 of Fig. 3. Fig. 3 is a view of a drill, illustrating my improvements, the conduit for supplying the fluid to the drill hole as well as the valve for controlling said supply, is shown in section. Fig. 4 is a view similar to Fig. 3, but showing the three-way valve in a different position.

The same reference characters indicate the same parts in all the views.

Let the numeral 5 designate the body of the drill, and 6 the valve for controlling the motive fluid supply thereto. This valve operates in a socket 7 formed in a valve casing $7^a$ that connects the motor with the feeding means $7^b$. Connected with one side of the body of the drill and communicating with the socket 7 of the main valve, is a valve casing 8 which is threaded into an opening 9. This valve casing 8 is provided with a passage 10 adapted to communicate with a port 12 formed in an auxiliary valve 13 journaled in the valve casing. This last-named valve is a three-way valve having its port 12 extending therethrough and also having an additional port 14. From the socket 7 of the main valve 6, a passage 15 leads to the recess 16, into which the valve casing 8 is inserted. The socket 7, passage 15 and recess 16 form in effect a motive fluid chamber. Screwed into the valve casing 8 on opposite sides are two nipples $17^a$ and 17, with which conduit members 18 and 19 are respectively connected. The conduit member 18 leads from a source of water supply while the conduit member 19 is utilized to carry either air or water as may be desired. The extremity of the conduit member 19 remote from the valve casing 8, is connected with a nipple 20 threaded into an elbow 21 whose opposite extremity communicates with a chamber 22 in which the chuck 23 for holding the drill steel 24 is inserted. This drill steel, as shown in the drawing, is provided with a longitudinal passage 25 for delivering fluid to the bottom of the drill hole, the inner extremity of said passage communicating with the chamber 22. A handle grip $8^a$ is threaded into the outer end of the valve casing, so that said casing and grip together constitute means for turning the drill, and the controlling means for the cleansing fluid is thus always conveniently accessible to the operator.

Assuming that the parts are in the position shown in Fig. 4, that is to say, assuming that the auxiliary valve 13 is adjusted to bring its port 12 into alinement with the nipples 17[a] and 17, the water will pass freely from the conduit member 18, through the port 12 of the valve, and thence through the member 19, the nipple 20 and the elbow 21, into the chamber 22 of the drill and thence through the passage 25 of the drill steel to the bottom of the hole. Now assuming that it is desired to cut off the water suply and introduce air to the drill for cleaning purposes, the auxiliary valve 13 will be adjusted or turned to the position shown in Fig. 3, whereby the water supply is cut off, and the motive fluid allowed to pass from the valve chamber 7, through the passage 15, the chamber 16, the passage 10, and the ports 12 and 14 of the auxiliary valve, to the conduit member 19, and thence to the drill hole by the same path as heretofore explained in describing the course of the water.

Attention is called to the fact that the motive fluid for actuating the drill is introduced thereto through an opening 26 formed in a nipple 27 threaded into the body of the drill as shown at 28, and having a passage 29 communicating with the valve chamber 7. The motive fluid passes from the chamber 7 to the body of the drill through a port 30 of the valve. As nothing is claimed on the special construction whereby the motive fluid is supplied to the drill body for operating the drill steel, no further explanation in regard to this subject will be required.

When it is desired to admit motive fluid to the hole independently of the operation of the drill, the auxiliary valve 13 is adjusted or turned to the position as shown in Fig. 3, whereby the water supply is cut off. The main valve 6 is then adjusted so that communication between the operating mechanism of the drill is also cut off. This allows the motive fluid to pass direct from the motive fluid supply to the valve chamber 7, through the passage 15, the chamber 16, the passage 10, and the ports 12 and 14 to the auxiliary valve, to the conduit member 19, and thence to the drill hole.

Having thus described my invention, what I claim, is:—

1. A drill body provided with a hollow drill bit, a conduit connected with the forward end of the drill body for delivering the drill-hole cleaning fluid to said hollow drill bit, a valve casing interposed between the forward and rear members of the said conduit and threaded into the body of the drill, the valve piece passage therein located in said valve casing, a connection between the motive fluid receiving portion of the drill body and the chamber of the valve, whereby motive fluid is supplied from the drill body to the valve, the valve being capable of adjustment to allow the motive fluid to pass through the forward member of the conduit while communication with the rear member is cut off, or to open communication between the two members of the conduit while the motive fluid is cut off, and suitable means for delivering motive fluid to the drill hole independently of the operation of the drill.

2. In a drill hole cleaning attachment for motive fluid actuated drills, the combination with a drill body provided with a main passage for delivering motive fluid through the drill steel to the drill hole, of a valve for controlling the flow of motive fluid through said passage independently of the motive fluid supply to the drill, and a water supply conduit in communication with the valve chamber, the valve being provided with openings whereby when it is properly adjusted, either motive fluid or the water may be delivered to the main passage leading to the drill hole.

3. The combination with a motive fluid actuated drill and means for supplying the motive fluid thereto, of a valve casing mounted on the body of the drill and in communication with the motive fluid supply thereto, said drill body and valve casing being provided with a main passage leading from the valve chamber to the drill steel, means for supplying water to the valve casing, a valve located therein and provided with openings, said valve being adjusted to allow either the water or the motive fluid to pass therethrough into the main passage leading to the drill steel.

4. The combination with a motive fluid actuated drill and means for supplying motive fluid thereto, of a valve casing mounted on the drill body and in communication with the motive fluid supply, the body of the drill and the valve casing being provided with a main passage connecting the valve casing with the drill steel, means for supplying water to the valve casing, a valve located in the said casing and provided with two passages, the valve being adjustable to bring the said passages alternately into communication with the main passage leading to the drill steel and the water or motive fluid supply as may be desired.

5. In mechanism of the character set forth, the combination with drilling mechanism including a motor and a drill bit, of a handle for turning the drilling mechanism, means for supplying a gaseous cleansing fluid and a liquid to the drill hole, and a common controlling valve for the fluid and liquid, said valve being carried by the handle.

6. In mechanism of the character set forth, the combination with drilling mechanism, including a motor and a drill bit, of a handle for turning the drilling mechanism, means for supplying a gaseous cleansing fluid and a liquid to the drill hole, and means mounted on the handle for controlling the supplies of gaseous cleansing fluid and liquid to said drill hole.

In testimony whereof, I have hereunto set my hand in the presence of two subscribing witnesses.

DANIEL S. WAUGH.

Witnesses:
P. M. HOLDSWORTH,
FRED HUMPHREY.

Copies of this patent may be obtained for five cents each, by addressing the "Commissioner of Patents, Washington, D. C."